(12) United States Patent
Heuschmann et al.

(10) Patent No.: US 8,515,718 B2
(45) Date of Patent: Aug. 20, 2013

(54) METHOD AND DEVICE FOR VISUALIZING AN INSTALLATION OF AUTOMATION SYSTEMS TOGETHER WITH A WORKPIECE

(75) Inventors: Christian Heuschmann, Haldensleben (DE); Thilo Stolper, Nürnberg (DE); Dieter Walter, Hessdorf (DE)

(73) Assignee: Siemens AG, Munich (DE)

( * ) Notice: Subject to any disclaimer, the term of this patent is extended or adjusted under 35 U.S.C. 154(b) by 248 days.

(21) Appl. No.: 12/865,374

(22) PCT Filed: Jan. 31, 2008

(86) PCT No.: PCT/EP2008/000781
§ 371 (c)(1),
(2), (4) Date: Jul. 29, 2010

(87) PCT Pub. No.: WO2009/097865
PCT Pub. Date: Aug. 13, 2009

(65) Prior Publication Data
US 2010/0332006 A1 Dec. 30, 2010

(51) Int. Cl.
*G06F 19/00* (2011.01)

(52) U.S. Cl.
USPC .............................................. 703/6; 345/427

(58) Field of Classification Search
USPC .............................................. 703/6; 345/427
See application file for complete search history.

(56) References Cited

U.S. PATENT DOCUMENTS

| 5,276,785 | A | * | 1/1994 | Mackinlay et al. | 345/427 |
|---|---|---|---|---|---|
| 6,236,399 | B1 | | 5/2001 | Nishiyama et al. | |
| 7,133,041 | B2 | * | 11/2006 | Kaufman et al. | 345/419 |
| 7,275,023 | B2 | * | 9/2007 | Chen et al. | 703/2 |
| 7,287,220 | B2 | * | 10/2007 | Kaasila et al. | 715/201 |
| 7,489,976 | B2 | * | 2/2009 | Adra | 700/29 |
| 7,953,513 | B2 | * | 5/2011 | Bhat et al. | 700/197 |
| 2004/0233222 | A1 | * | 11/2004 | Lee et al. | 345/621 |
| 2006/0103650 | A1 | * | 5/2006 | Kamiwada et al. | 345/427 |
| 2007/0078531 | A1 | * | 4/2007 | Adra | 700/31 |
| 2007/0216681 | A1 | * | 9/2007 | Nishida et al. | 345/427 |
| 2007/0236502 | A1 | * | 10/2007 | Huang et al. | 345/473 |
| 2007/0279436 | A1 | * | 12/2007 | Ng et al. | 345/624 |

FOREIGN PATENT DOCUMENTS

EP  1 749 621  2/2007

OTHER PUBLICATIONS

Ressler et al., "A VRML Integration Methodology for Manufacturing Applications", Proceedings VRML, 1999, XP007900034, pp. 167-172.

* cited by examiner

*Primary Examiner* — Michael D Masinick
(74) *Attorney, Agent, or Firm* — Cozen O'Connor

(57) ABSTRACT

A method and a device for visualizing a workpiece in a visualized model of an automated installation. In accordance with the invention, the method comprises making available a selection device to the user of the visualized model of the automated installation, visualizing the automated installation together with the workpiece and centering the workpiece in the visualized model of the automated installation, where the selection device is used by the user to preselect the workpiece.

33 Claims, 4 Drawing Sheets

Position A 300
302

Position B 300
302

Position C 300
302

Position A 300
302

Position B 300
302

Position C 300
302

METHOD AND DEVICE FOR VISUALIZING AN INSTALLATION OF AUTOMATION SYSTEMS TOGETHER WITH A WORKPIECE

CROSS-REFERENCE TO RELATED APPLICATIONS

This is a U.S. national stage of International Application No. PCT/EP2008/000781, filed on 31 Jan. 2008.

BACKGROUND OF THE INVENTION

1. Field of the Invention

The invention relates in general to a method and a device for visualizing an automation system having a workpiece and, more particularly, to a method and a device for visualizing an automation system containing a workpiece, the workpiece being displayed centered in the visualization.

2. Description of Related Art

Automated installations or, as the case may be, automation systems are deployed in a multiplicity of applications, such as in the production of mass-produced goods. An automated system and the process steps executing in the automated system, which are performed on individual workpieces requiring processing, for example, are controlled by a control program and for example a Programmable Logic Controller (PLC) programmed therewith. Simulations comprising visualization, such as 3D visualization of automated systems, are available for testing the control program and the process steps executing according to said program. Conventional 3D visualizations of operator control faceplates of an automated system, simulations of an automated system or "mock-ups" of the automated system provide different navigation modes for the movement through the 3D scene of an automated system being simulated in this way. Thus, in accordance with the conventional 3D visualizations there exists the possibility to "fly" through the system, rotate about fixed points or to move along deterministic paths. Furthermore, there are combinations of the cited navigation possibilities or modifications which result from additional restrictions to degrees of freedom.

Because of the often highly complex and numerous operating processes that are performed on a workpiece in an automated system it may be necessary to select an individual workpiece also in a visualization or, as the case may be, simulation of the automated system and to track it using a simulated process flow to, for example, enable the aforementioned control program to be tested and improved prior to implementation in the automated system.

SUMMARY OF THE INVENTION

It is an object of the invention to provide a method for visualizing an automated system and a corresponding device.

This and other objects and advantages are achieved in accordance with the invention by providing a method for visualizing a workpiece in a visualization of an automation system in which a selection device is provided for a user of the visualization of the automated system, and the automated system having the workpiece is visualized and the workpiece is centered in the visualization of the automated system, where the workpiece is selected previously by the user with the aid of the selection device.

In accordance with the invention, visualization of the automated system is a 3D visualization of an automated system. Alternatively the visualization is a 3D simulation of the automated system. The automated system contains one or more workpieces, with processes that are performed on the workpiece or workpieces by the automated system being represented in the 3D visualization. Here, a workpiece is typically orders of magnitude smaller than the automation system itself. In accordance with the present embodiment, devices are provided for a user of the visualization so that the user can select the workpiece in the representation of the automated system, whereupon a visualization of the automated system is presented in which the workpiece is arranged centered in the display.

Here, the visualization of the automated system having the workpiece is typically performed by a computer system and the representation of the visualization is output to a display screen. Accordingly the selection device is, for example, a dialog which is displayed on the screen and by which the corresponding workpiece can be selected. Alternatively, hereto, the user can click directly on the workpiece in the visualization of the automatic system, using a device such as a mouse pointer, whereupon the workpiece is centered in the visualization of the automated system.

An advantage of the method in accordance with the invention is that the user can directly monitor the workpiece that is to be processed by the automated system and, for example, can track the process steps that are performed on the workpiece by the system. As a result, the aforementioned control program can be tested in advance in relation to the control processes implemented therein for the individual production steps that are to be performed on the workpiece by the automated system. Ultimately, testing in this manner leads to a control program that has been tested such that it needs to be tested far less thoroughly after it is implemented in the actual automated system upon completion of the test phase, with the result that in certain cases the downtimes and test times on the real automated system can be significantly shortened.

In an embodiment of the invention, a centered visualization of the workpiece is also provided in the event of a movement of the workpiece in relation to the automated system. The 3D visualization of the automated system is, as already indicated above, not only embodied for generating static 3D representations of the automated system and displaying them on a screenbut, the method and process steps executing in the automated system can also be visualized in that, for example, a sequence of individual views which reproduce the process steps is visualized. In accordance with the contemplated embodiment, a centered visualization of the workpiece during the representation of the individual method or process steps is also provided in the event of a movement of the Workpiece in relation to the automated system, whereupon it is possible to simulate and subsequently evaluate the processes performed on the workpiece by the automated system.

In another embodiment, a fixed first coordinate system is defined for the visualization of the automated system, where the position of the workpiece in the first coordinate system changes in the event of a movement of the workpiece in the automated system, the workpiece is visualized centered in relation to a first direction and the first direction is fixed relative to the first coordinate system. In accordance with the present embodiment, the automated system having the centered workpiece is visualized from a fixed viewing direction in relation to the first coordinate system, where the viewing direction corresponds to the first direction. The user or observer of the visualization thus sees merely different sections of the automated system having the selected workpiece positioned in the center of the visualization.

In accordance with another embodiment, a second coordinate system is defined for the visualization of the automated system, where the position of the workpiece in the second coordinate system is fixed. The workpiece is visualized centered in relation to a second direction. The second direction is fixed relative to the second coordinate system. The second coordinate system is therefore a coordinate system co-moving with the workpiece. Accordingly, the observer always looks from one direction, the second direction, at the workpiece. Thus, while the workpiece moves in the system, the view is automatically adjusted in the event of a change in the direction of movement of the workpiece.

In yet another embodiment, the automated system having the workpiece centered therein is visualized in relation to a third direction. Here, the third direction runs at a constant angle to the direction of movement of the workpiece. The direction of movement of the workpiece relative to the automated system is, in this case, determined, for example, using the aforementioned first coordinate system. In addition, a change in the direction of movement of the workpiece relative to the automated system is detected in the visualization of the automated system. This is followed by a realignment of the third direction such that the realigned third direction runs at the constant angle to the new direction of movement of the workpiece. The automated system having the workpiece centered therein is then visualized in relation to the changed realigned third direction. Thus, the observer now looks from the direction of the realigned third direction onto the automated system. Alternatively, the observer looks onto the workpiece centered therein and during the simulation of the movement of the workpiece through the system has the impression of "running after" the workpiece.

In another embodiment, the first direction is settable. In accordance with another embodiment, the second direction can be set by the user of the visualization, such as by a dialog displayed on the screen. In accordance with a further embodiment, the same applies to the aforementioned angle.

In accordance with a further embodiment, the visualization of the automated system is zoomable. In particular, the visualization of the automated system having the centered workpiece is zoomable. This has the advantage that, on the one hand, the observer can monitor the process flows performed on the workpiece more closely and, on the other, by adjusting the zoom factor, the observer can also quickly gain an overview of the location of the workpiece in the automated system during the 3D visualization. In short, the zoom enables the observer, on the one hand, to obtain a global picture of the automated system having the workpiece centered in the visualization and, on the other hand, to also monitor the details of the process flows on the workpiece that are performed by the automated system.

In another embodiment, parts of the automated system that obscure the workpiece during the visualization are ascertained. Toward that end, for example, the workpiece is continuously checked to determined if the workpiece is obscured by concealing objects, i.e., parts of the automated system, which would obscure the workpiece, or would obscure it in a subsequent view that has not as yet been displayed. This happens, for example, by calculation of beams between the corners of the envelope of the workpiece relative to the representation of the workpiece on the screen and the collision check of the beams with the corresponding models of the concealing objects.

In yet another embodiment, the parts of the automated system that would obscure the workpiece during the visualization are displayed transparently or are not displayed at all. This has the advantage that, even in the case of relatively complex process flows where many (component) parts of the automated system are in the immediate vicinity of the workpiece, the observer always has an unrestricted view onto the workpiece that is displayed centered in the visualization.

In a still further embodiment, the parts of the automated system that would obscure the workpiece during the visualization are compared with a predefined parts list. Here, only the parts of the automated system that are contained in the predefined parts list are displayed transparently or visualized at all. This has the advantage that, for example, the parts of the system that are important for the corresponding operating process performed on the workpiece are not masked out. As a result, the observer can look at the simulated operating process, on the one hand, with the workpiece in the center and, on the other hand, with the corresponding component part which performs the operating process on the workpiece in order, for example, thereby to test the control program developed and simulated by the user.

In an alternative embodiment, only the parts of the automated system that are not contained in the predefined parts list are displayed transparently or are not visualized. This has the advantage in particular that due to the potentially very large number of parts in the automated system it is more convenient for the user of the simulation to specify the parts in the parts list that the user wants to have visualized together with the workpiece rather than to specify the parts that are to be masked out.

In a still further embodiment, if parts of the automated system would obscure the workpiece during the visualization, then the view of the workpiece and the automated system is pivoted such that no parts of the automated system conceal the workpiece. This has the advantage that there is no masking out or, as the case may be, transparent displaying of the corresponding parts obscuring the workpiece. Rather, the view is pivoted such that the observer has an unrestricted view onto the workpiece without on the other hand having to accept a restriction of the view to the parts that are still contained in the view.

In a further embodiment, the view onto the workpiece is pivoted back to a suitable extent in the direction of the original view such that no new concealment occurs. In particular, the current view is reset to the direction of the original view if there is no longer any obscuring of the workpiece.

In another aspect, the invention relates to a computer program product having instructions that are executable on a computer. The computer program product comprises a computer-usable medium containing a computer-readable program. The instructions are embodied for performing the method according to the invention when they are executed by a computer.

In a further aspect, the invention relates to a device for visualizing a workpiece in an automated system. The device has a graphical user interface for visualizing the automated system having the workpiece and also has a selection device, where the workpiece is selectable in the user interface by a user with the aid of the selection device. The device additionally includes another device for centering the workpiece in the visualization of the automated system following selection of the workpiece by the user.

In addition, the invention relates to an automated system having a device in accordance with the invention and to a control and monitoring device for an automated system having a the device of the invention.

A device in accordance with an embodiment of the invention provides the user with a simple and intuitive way to monitor a workpiece in a 3D visualization of an automated system. The individual process steps that are performed on the workpiece within the automated system can also be monitored. Here, the user can adjust the view onto the workpiece such that he/she has the workpiece in an unobscured view and in a suitable size on the screen and together with the important system components. Accordingly, owing to the workpiece-centered and workpiece-tracking visualization, the device offers in a suitable and intuitive manner the possibility to track and simulate processes that are performed on the workpiece in the system. In particular, the tracking of an individual workpiece is very well suited to the verification of the control flows in an automation system and consequently also for testing the aforementioned control program.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred exemplary embodiments of the invention are explained in more detail below with reference to the drawings, in which.

DETAILED DESCRIPTION OF THE PREFERRED EMBODIMENTS

Figure 1:
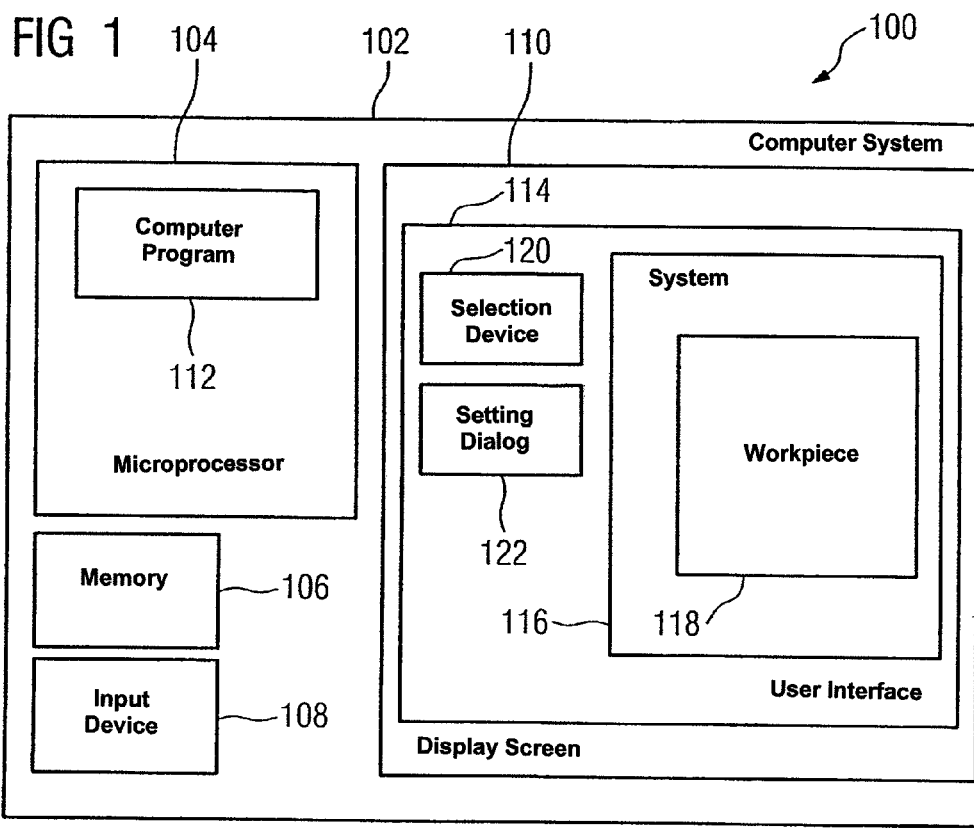
FIG. 1 is an illustration of a schematic block diagram of a device for visualizing a workpiece in an automated system in accordance with the invention.

FIG. 1 is an illustration of a schematic block diagram of a device 100 for visualizing a workpiece of an automated system. The device 100 comprises a computer system 102. The computer system 102 has a microprocessor 104, a memory 106, an input device 108 and a display screen 110.

The microprocessor 104 executes a computer program 112 which is permanently resident in the memory 106 and has been read out of the memory 106 by the microprocessor 104 for execution of the computer program. The computer program 112 serves for visualizing an automated system having a workpiece and generates on the display screen 110 a user interface 114 having selection device 120 and a setting dialog 122. The system 116 that is to be visualized is also presented within the user interface 114 on the display screen 110 by the computer program 112. The selection device 120 can be used by a user of the computer system 102 to select a workpiece 118 that is disposed within the automated system 116. The selection device 120 can be, for example, a list on which all workpieces in the simulated automated system 116 are displayed and the user can then click on the corresponding workpiece selected by him/her in this list with the aid of the input device 108, such as a mouse. After the user has selected the workpiece 118 with the aid of the selection means 120, the automated system 116 is visualized or displayed three-dimensionally such that the workpiece 118 is displayed centered.

In accordance with the invention, the computer system 102, i.e., the computer program 112, provides the user with selection device 120 within the user interface 116 that is used for visualizing an automated system, where the selection device enables the user to select workpieces within the automated system 116. A visualization of the automated system 116 is also presented in the user interface 114. The data required for visualizing the automated system 116 can be stored, for example, in the memory 106 and read out by the computer program 112, where the corresponding data for the visualization is computed from the stored data. With the selection device 120, the user can then select a workpiece 118, whereupon the visualization of the automated system 116 is modified such that the workpiece 118 is displayed centered. The workpiece 118 can also be tracked further on its passage through the automated system 116, insofar as the process flow is simulated in the automated system, such that the workpiece 118 is essentially displayed centered at all times.

In the visualization of the automated system 116 having the workpiece 118 centered in the visualization, the observer can look at the workpiece 118, e.g., the automated system 116, from different viewing directions. Here, the viewing directions can be set, for example, by the setting dialog 122. The setting dialog 122 offers the option to zoom in or out in the visualization of the automated system 116 having the workpiece 118 centered therein.

Automation systems are generally very complex in terms of their design and comprise a multiplicity of parts. Consequently, it is altogether possible that parts of the automated system would obscure the workpiece during the visualization. The computer program product 112 is embodied such that the parts of the automated system 116 concealing the workpiece 118 are computed and then displayed transparently during the visualization or else are not visualized at all. In particular, the parts obscuring the workpiece can be computed, i.e., ascertained at the runtime of the simulation. Alternatively, the computer program 112 can also be embodied such that the particular view of the workpiece 118 is pivoted such that no parts of the automated system continue to obscure the workpiece.

Figure 2:
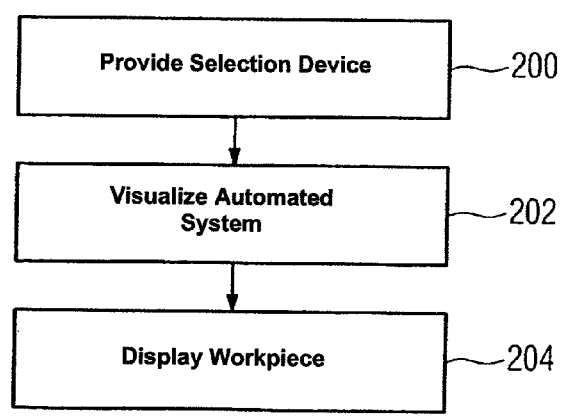
FIG. 2 is a flowchart illustrating a method in accordance with an embodiment of the invention.

FIG. 2 is an illustration of a flowchart of the method in accordance with the invention for visualizing a workpiece in an automated system. According to step 200, a selection device is provided for a user of the visualization of the automated system. At step 202, the automated system having the workpiece is visualized and at step 204 the workpiece is displayed centered in the visualization of the automated system in response to a selection of the workpiece by the user with the aid of the selection means.

Figure 3:
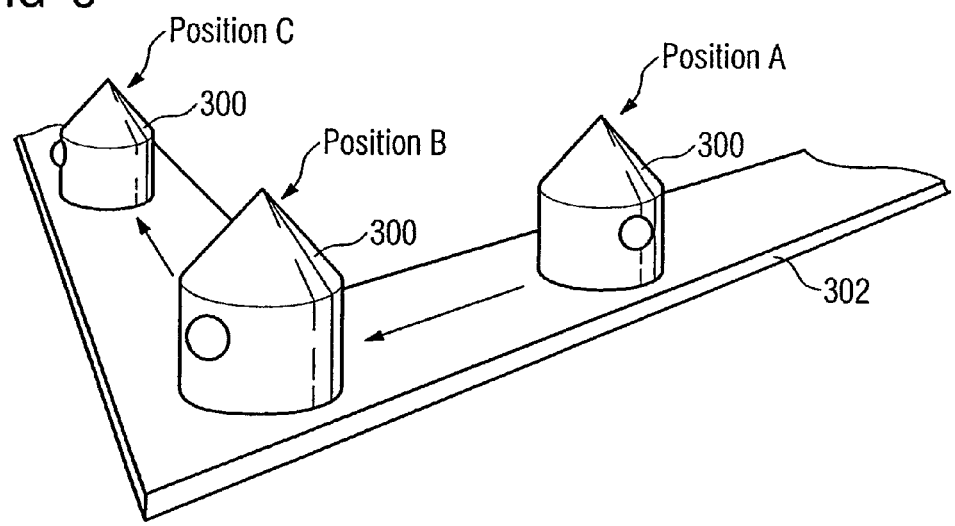
FIG. 3 is a schematic illustration of positions of a workpiece during three different processing phases in an automated system in accordance with the invention.

FIG. 3 is an exemplary block diagram of three positions, i.e., Position A, Position B and Position C, which a workpiece 300 passes through in an automated system 302, for example, during the corresponding processing phases of the workpiece 300 in the automated system 302. The arrows in FIG. 3 between the positions of the workpiece 300 indicate the direction of movement of the workpiece 300 from position A to position B, and from position B to position C.

Figure 4:
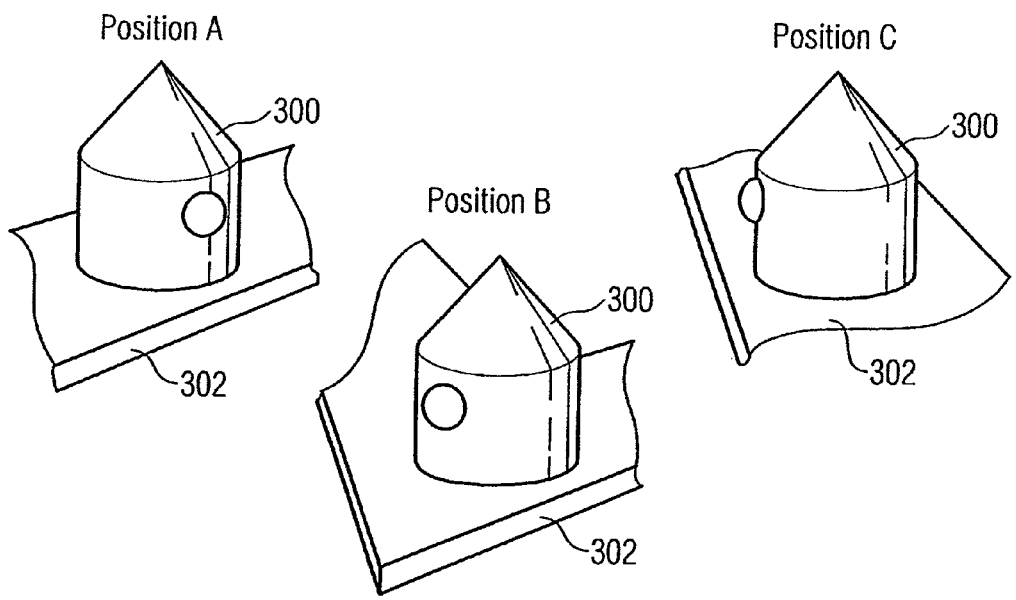
FIG. 4 is an illustration of centered visualizations of the workpiece during three processing phases of a viewing direction that is fixed in relation to a first, fixed coordinate system in accordance with the invention.

FIG. 4 is an illustration of centered visualizations of each workpiece 300 during one of the three aforementioned positions A, B and C, of FIG. 3 in the case of a viewing direction that is fixed in relation to a first, fixed coordinate system. In the 3D visualization of the workpiece 300, i.e., the automated system 302, each workpiece is displayed centered after it has been selected by the user or observer of the visualization with the aid of the aforementioned selection device, such that in the visualization of the passage of the workpiece 300 through the automated system 302, as explained with reference to FIG. 3, the observer is presented with the views, shown in FIG. 4, of the workpiece 300 or the automated system 302 in position A, position B position C of the workpiece 300 in the automated system 302. Here, as mentioned above, the viewing direction of the observer is always provided in a specific direction in relation to the first coordinate system, which is fixed.

Figure 5:
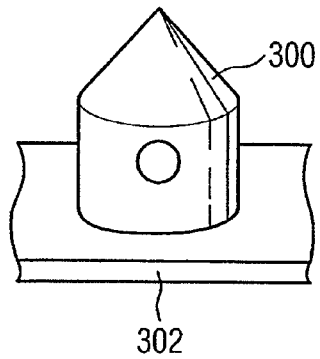
FIG. 5 is an illustration of three centered visualizations of a workpiece during three processing phases of a viewing direction that is fixed in relation to a second coordinate system that co-moves with the workpiece in accordance with an embodiment of the invention.
Figure 5:
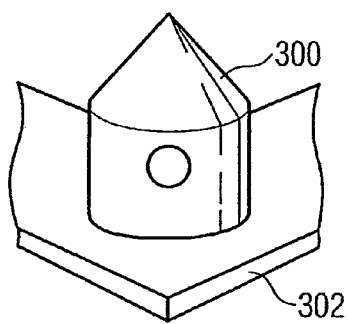
Figure 5:
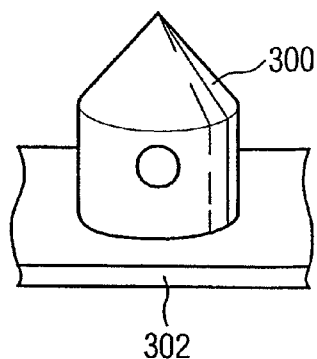

In contrast thereto, FIG. 5 is an illustration of the views of the observer onto the workpiece 300, i.e., the automated system 302, during the positions A, B and C. After the workpiece 300 has been selected by the observer, as shown in FIG. 5, the workpiece 300 is displayed centered in each case. The observer looks from one direction onto the workpiece 300 or, as the case may be, the system 302, where the direction is fixed in relation to a second, internal coordinate system of the workpiece. Thus, the view of the observer onto the workpiece 300 is essentially always the same, since the view is adjusted accordingly in the event of a rotation of the workpiece 300 relative to the system 302 owing to the coupling to the second coordinate system.

Figure 6:
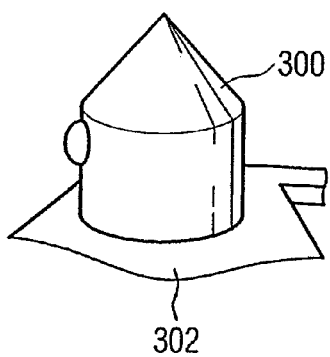
FIG. 6 is an illustration of centered visualizations of a workpiece during three processing phases of an adjustment of the views that is dependent on the direction of movement in accordance with an embodiment of the invention.
Figure 6:
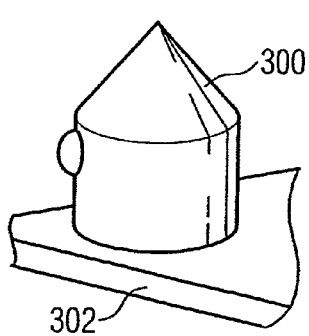
Figure 6:
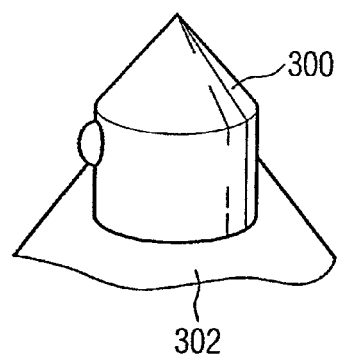

FIG. 6 is an illustration of views of the observer onto the workpiece 300 or, i.e., the automated system 302, during the positions A, B and C in the event of a view onto the workpiece 300 that is dependent on the direction of movement. While the workpiece 300 in the automated system 302 moves, for example from position A to position B, (see, e.g., FIG. 3), the view is automatically adjusted if there is a change in the direction of movement of the workpiece. The view i.e., the viewing direction, is corrected such that if there is a change in the direction of movement of the workpiece the angle between the motion vector of the workpiece and the distance between the workpiece and the point of observation remains constant. The observer therefore has the impression of running after the workpiece or the view that would be seen upon pursuing an object from the rear.

Figure 7:
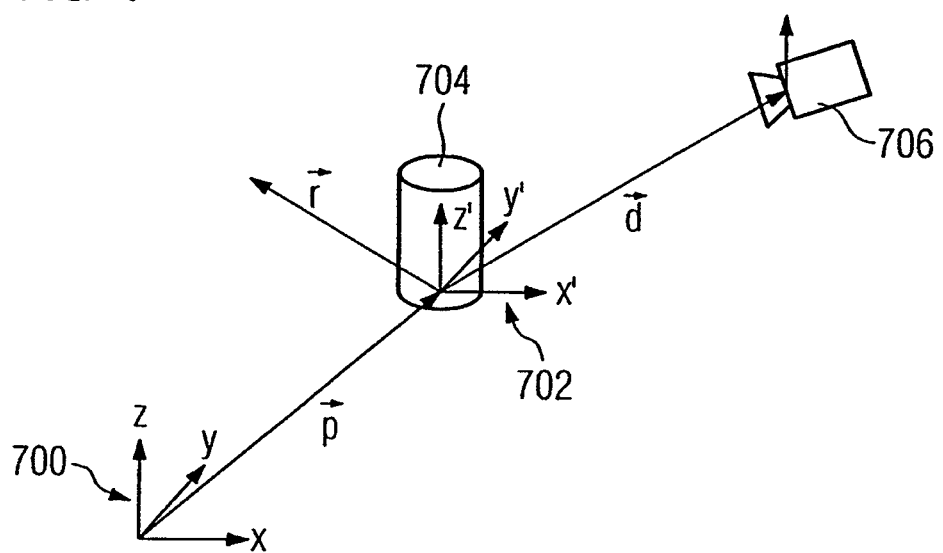
FIG. 7 is an illustration of a relationship between first and second coordinate system in accordance with the disclosed embodiment of the invention.

FIG. 7 is an illustration of the relationship between a first coordinate system 700 and a second coordinate system 702. The first coordinate system 700 is a fixed coordinate system of, for example, the automated system (not shown here). The second coordinate system 702 is an internal coordinate system of a workpiece 704. The workpiece 704 is visualized from the viewing direction of an observer that corresponds to the view of a camera 706.

In accordance with an embodiment, a centered visualization of the workpiece 704 is provided with an alignment of the camera 706 that remains constant in relation to the first coordinate system 700. In accordance with another embodiment, a centered visualization of the workpiece 704 is provided with an alignment of the camera 706 that remains constant in relation to the second coordinate system 702. Here, the norm of the distance vector d (vectors are represented here printed in bold and in FIG. 7 with an arrow over the corresponding letter) between workpiece 704 and camera 706 can be set by the observer, such as by the zoom function, and adjusted during the visualization. The initial norm of the distance vector d can be calculated, for example, from a configured ratio between the size of the visualization window and the envelope geometry of the workpiece.

In accordance with a further embodiment, the position vector p of the workpiece relative to the first coordinate system 700 can be acquired. The position vector p runs, for example, from the origin of the first coordinate system 700 to the origin of the second coordinate system 702. In addition the camera 706 is arranged in relation to the workpiece 704 such that the angle between the distance vector d and the position vector p remains constant. While the workpiece 704 moves in the automated system (not shown here) the alignment of the camera 706 is adjusted accordingly in the event of a change in the direction of movement r of the workpiece 704 such that the aforementioned angle remains constant.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for visualizing a workpiece in a visualization of an automated system, the method comprising the steps of:
   providing a selection device for a user of the visualization of the automated system;
   visualizing the automated system having the workpiece in a simulated workflow; and
   centering the workpiece in the visualization in the process flow simulated in the automated system, the workpiece being preselected by the user with the selection device;
   wherein a fixed first coordinate system is defined for the visualization of the automated system, wherein a position of the workpiece in the fixed first coordinate system changes upon movement of the workpiece in the automated system, wherein the workpiece is visualized centered in relation to a first direction, and wherein the first direction is fixed relative to the fixed first coordinate system.

2. The method as claimed in claim 1, further comprising:
   providing a centered visualization of the workpiece upon movement of the workpiece in relation to the automated system.

3. The method as claimed in claim 1, wherein a second coordinate system is defined for the visualization of the automated system, wherein the position of the workpiece in the second coordinate system is fixed, wherein the workpiece is visualized centered in relation to a second direction, and wherein the second direction is fixed relative to the second coordinate system.

4. The method as claimed in claim 1, further comprising the steps of:
   visualizing the automated system having the workpiece centered therein, the visualization being provided in relation to a third direction that runs at a constant angle to a direction of movement of the workpiece;
   detecting a change in the direction of movement of the workpiece to a new direction relative to the automated system in the visualization of the automated system; and changing the third direction such that the changed third direction runs at the constant angle to the new direction of movement of the workpiece and visualizing the automated system in relation to the changed third direction.

5. The method as claimed in claim 4, wherein the constant angle is settable by the user.

6. The method as claimed in claim 1, wherein the visualization of the automated system having the centered workpiece is zoomable.

7. The method as claimed in claim 1, wherein parts of the automated system that obscure the workpiece during the visualization are ascertained.

8. The method as claimed in claim 7, wherein the parts of the automated system that would obscure the workpiece during the visualization are one of displayed transparently and not visualized.

9. The method as claimed in claim 7, wherein the parts of the automated system that would obscure the workpiece during the visualization are compared with a predefined parts list and only the parts of the automated system that are contained in the predefined parts list are one of displayed transparently and not visualized.

10. The method as claimed in claim 7, wherein the parts of the automated system that would obscure the workpiece during the visualization are compared with a predefined parts list and only the parts of the automated system that are not contained in the predefined parts list are displayed transparently or are not visualized.

11. The method as claimed in claim 10, wherein a view onto the workpiece is pivoted back to a suitable extent in a direction of the original view such that no new concealment occurs.

12. The method as claimed in claim 7, wherein if parts of the automated system would obscure the workpiece during the visualization, a view of the workpiece and the automated system is pivoted such that no parts of the automated system conceal the workpiece.

13. A process in which a computer executes instructions set forth in a computer program executing on a processor which, when executed on the computer apparatus, causes the processor to visualize a workpiece in a visualization of an automated system, the computer program comprising:
    program code for providing a selection device for a user of the visualization of the automated system;
    program code for visualizing the automated system having the workpiece in a simulated workflow; and
    program code for centering the workpiece in the visualization in the process flow simulated in the automated system, the workpiece being preselected by the user with the selection device;
    wherein a fixed first coordinate system is defined for the visualization of the automated system, wherein a position of the workpiece in the fixed first coordinate system changes upon movement of the workpiece in the automated system, wherein the workpiece is visualized centered in relation to a first direction, and wherein the first direction is fixed relative to the fixed first coordinate system.

14. A device for visualizing an automated system having a workpiece, the device comprising:
    a graphical user interface for visualizing the automated system having the workpiece in a simulated workflow;
    a selection device, the workpiece being selectable in the graphical user interface by a user using the selection device;
    a centering device for centering the workpiece in the visualization in the process flow simulated in the automated system after the workpiece has been selected by the user; and
    means for adjusting a view such that if parts of the automated system would obscure the workpiece during the visualization, the view of the workpiece and the automated system is adjusted such that no parts of the automated system conceal the workpiece.

15. The device as claimed in claim 14, further comprising:
    a tracking device for tracking the workpiece in the automated system upon a movement of the workpiece relative to the automated system, the tracking device being configured such that a workpiece-tracking visualization is provided.

16. The device as claimed in claim 15, further comprising:
    means for generating a first coordinate system which is fixed in relation to the automated system;
    wherein a position of the workpiece in the first coordinate system changes upon the movement of the workpiece in the automated system;
    wherein the workpiece can be visualized centered in relation to a first direction; and
    wherein the first direction is fixed in the first coordinate system.

17. The device as claimed in claim 15, further comprising:
    means for generating a second coordinate system which is fixed in relation to the workpiece;
    wherein the workpiece can be visualized centered in relation to a second direction; and
    wherein the second direction is fixed in the second coordinate system.

18. The device as claimed in claim 15, further comprising:
    means for visualizing the automated system having the workpiece centered therein, the visualization being represented in relation to a third direction which runs at a constant angle to a direction of movement of the workpiece;
    means for detecting a change in the direction of movement of the workpiece relative to the automated system in the visualization of the automated system;
    means for adjusting the third direction such that the third direction runs at the constant angle to a new direction of movement of the workpiece, and
    means for visualizing the automated system in relation to a changed third direction.

19. The device as claimed in claim 14, further comprising:
    means for generating a first coordinate system which is fixed in relation to the automated system;
    wherein a position of the workpiece in the first coordinate system changes upon a movement of the workpiece in the automated system;
    wherein the workpiece can be visualized centered in relation to a first direction; and
    wherein the first direction is fixed in the first coordinate system.

20. The device as claimed in claim 19, wherein the first direction, is settable by the user with the user interface.

21. The device as claimed in claim 14, further comprising:
    means for generating a second coordinate system which is fixed in relation to the workpiece;
    wherein the workpiece can be visualized centered in relation to a second direction; and
    wherein the second direction is fixed in the second coordinate system.

22. The device as claimed in claim 21, wherein the second direction is settable by the user with the user interface.

23. The device as claimed in claim 14, further comprising:
means for visualizing the automated system having the workpiece centered therein, the visualization being represented in relation to a third direction which runs at a constant angle to a direction of movement of the workpiece;
means for detecting a change in the direction of movement of the workpiece relative to the automated system in the visualization of the automated system;
means for adjusting the third direction such that the third direction runs at the constant angle to a new direction of movement of the workpiece, and
means for visualizing the automated system in relation to a changed third direction.

24. The device as claimed in claim 23, wherein the constant angle is settable by the user with the user interface.

25. The device as claimed in claim 14, further comprising:
means for zooming in the visualization of the automated system having the centered workpiece in the user interface, said means for zooming being adjustable by the user.

26. The device as claimed in claim 14, further comprising:
means for ascertaining parts of the automated system that obscure the workpiece during the visualization.

27. The device as claimed in claim 26, wherein said means for ascertaining parts are configured such that the parts of the automated system are computable upon movement of the workpiece relative to the automated system such that the parts are one of displayed transparently and not visualized during the visualization.

28. The device as claimed in claim 27, wherein the device includes a database containing a predefined parts list of the automated system, parts that would obscure the workpiece during the visualization being compared with the predefined parts list and only the parts of the automated system that are contained in the predefined parts list begin one of displayed transparently and not visualized.

29. The device as claimed in claim 27, wherein the device includes a database containing a predefined parts list of the automated system, parts that would obscure the workpiece during the visualization being compared with the predefined parts list and the parts of the automated system that are not contained in the predefined parts list being one of displayed transparently and not visualized.

30. The device as claimed in claim 26, wherein the device includes a database containing a predefined parts list of the automated system, parts that would obscure the workpiece during the visualization being compared with the predefined parts list and only the parts of the automated system that are contained in the predefined parts list being one of displayed transparently and not visualized.

31. The device as claimed in claim 14, wherein a view onto the workpiece is be resettable back to a suitable extent in a direction of an original view such that no new concealment occurs.

32. An automated system having the device as claimed in claim 14.

33. A control and monitoring device for an automated system, wherein the control and monitoring device includes the device as claimed in claim 14.

\* \* \* \* \*